United States Patent [19]

Hennig

[11] Patent Number: 5,153,487
[45] Date of Patent: Oct. 6, 1992

[54] METHOD AND CIRCUIT FOR THE MONITORING OF ELECTROMOTIVE CONTROLLING ELEMENTS

[75] Inventor: Thomas Hennig, Sossenheim, Fed. Rep. of Germany

[73] Assignee: VDO Adolf Schindling AG, Frankfurt am Main, Fed. Rep. of Germany

[21] Appl. No.: 568,595

[22] Filed: Aug. 16, 1990

[30] Foreign Application Priority Data

Aug. 25, 1989 [DE] Fed. Rep. of Germany ....... 3928160

[51] Int. Cl.⁵ .............................................. H02P 7/68
[52] U.S. Cl. ..................................... 318/293; 318/112
[58] Field of Search ................ 318/254, 293, 112, 434

[56] References Cited

U.S. PATENT DOCUMENTS

| | | | |
|---|---|---|---|
| 4,060,753 | 11/1977 | Okuyama et al. | 318/254 X |
| 4,234,838 | 11/1980 | Langley et al. | 318/696 |
| 4,368,411 | 1/1983 | Kidd | 318/254 |
| 4,383,205 | 5/1983 | Guisinger | 318/254 |
| 4,455,514 | 6/1984 | Ohno | 318/254 |
| 4,490,661 | 12/1984 | Brown et al. | 318/661 |
| 4,494,181 | 1/1985 | Ramlohr et al. | 363/63 |
| 4,563,619 | 1/1986 | Davis et al. | 318/138 |
| 4,673,852 | 6/1987 | Geiger | 318/139 X |

*Primary Examiner*—Bentsu Ro
*Attorney, Agent, or Firm*—Martin A. Farber

[57] ABSTRACT

In a method and a circuit for the monitoring of electromotive setting elements which are connected to a bridge output stage, the actual values of the currents in the branches of the bridge are compared with the desired values which apply to the corresponding state of switching. Depending on the result of the comparison and the state of switching of the bridge output stage, an error possibly present is read from a table. It should be emphasized, in particular, in this connection that with only one bridge circuit, two motors which are connected in parallel can be completely monitored.

8 Claims, 4 Drawing Sheets

| (1) | (2) | (3) | (4) | | (5) | |
|---|---|---|---|---|---|---|
| | | | OP A | OP B | OP A | OP B |
| A | 1 + 2 | (8) | < | = | = | > |
| A | 2 + 3 | (9) | < | = | = | < |
| A | 1 + 4 | (10) | > | < | > | < |
| A | 3 + 4 | (11) | < | = | < | < |
| A | 1 + 2 + 3 | (12) | > | < | > | > |
| A | 2 + 3 + 4 | (13) | < | = | < | < |
| A | — | (14) | < | = | = | < |
| A + B | — | (15) | < | = | = | < |
| A | 2 + 4 | (16) | = | = | = | = |
| B | 1 + 2 | (17) | < | > | < | > |
| B | 2 + 3 | (18) | < | < | = | < |
| B | 1 + 4 | (19) | > | = | = | < |
| B | 3 + 4 | (20) | < | = | = | < |
| B | 1 + 2 + 3 | (21) | > | > | < | > |
| B | 2 + 3 + 4 | (22) | < | < | = | < |
| B | — | (23) | < | = | = | < |
| B + A | — | (24) | < | = | = | < |
| B | 2 + 4 | (25) | = | = | = | = |

| (1) | (2) | (3) | (33) | | (34) | |
|---|---|---|---|---|---|---|
| | | | OP A | OP B | OP A | OP B |
| C | 1 + 2 | (8) | = | < | < | = |
| C | 2 + 3 | (9) | = | = | < | = |
| C | 1 + 4 | (10) | < | < | < | > |
| C | 3 + 4 | (11) | = | < | > | < |
| C | 1+2+3 | (12) | < | < | < | > |
| C | 2+3+4 | (13) | = | = | > | < |
| C | — | (14) | = | < | < | = |
| C+D | — | (15) | = | < | < | = |
| C | 2 + 4 | (16) | = | = | = | = |
| D | 1 + 2 | (17) | > | < | < | < |
| D | 2 + 3 | (18) | < | > | < | = |
| D | 1 + 4 | (19) | < | < | < | = |
| D | 3 + 4 | (20) | = | < | = | = |
| D | 1+2+3 | (21) | > | < | < | < |
| D | 2+3+4 | (22) | < | > | = | = |
| D | — | (23) | = | < | < | = |
| D+C | — | (24) | = | < | < | = |
| D | 3 + 4 | (25) | = | = | = | = |

METHOD AND CIRCUIT FOR THE MONITORING OF ELECTROMOTIVE CONTROLLING ELEMENTS

The present invention relates to a method and a circuit for monitoring electromotive controlling elements which are connected to a bridge output stage.

Electromotive controlling elements frequently fulfill a safety-relevant function, so that danger can result from their failure or incorrect action. This is true, for instance, of controlling elements for controlling the power of the engine of a motor vehicle (E-Gas). One reason for improper action of an electromotive controlling element can, for instance, be an error in the feed line between an output stage and the motor of the controlling element. Such an error may consist of a grounding, an interruption in the feed line or a short circuit with respect to the operating voltage or a combination of these errors.

SUMMARY OF THE INVENTION

It is an object of the present invention to permit the monitoring of electromotive controlling elements which are connected to a bridge output stage.

According to the method of the invention, the actual values of the currents in the branches of the bridge are compared with the desired values which apply to the specific state of switching, and any error possibly present is read from a table as a function of the result of a comparison and of the state of switching of the bridge output stage.

The method of the invention makes it possible to recognize and distinguish individual ones of the above-mentioned errors so that suitable countermeasures, for instance a signalling of the error, the disconnecting of the operating voltage, or the activating of an emergency device can take place. It should be particularly emphasized in this connection that two motors which are connected in parallel can be completely monitored with only one bridge circuit.

In accordance with a further aspect of the invention it is provided that the voltage at one terminal of the bridge output stage is adjusted in case the branches of the bridge are non-conducting by the feeding of a test voltage over a resistor. The test voltage is monitored. In this way it is possible, even when there is no current and when, therefore, a set of four semiconductor switches of the bridge output stage are non-conductive to recognize a grounding or contact with the supply voltage.

In accordance with another feature of the method of the invention, in the event of a parallel connection of two electromotive controlling elements the currents in the branches of the bridge are measured between the terminals of the electromotive controlling elements on, in each case, one branch of the bridge. In this way, errors in the use of two electromotive controlling elements which are connected in parallel can be recognized in advantageous fashion.

One advantageous circuit for the carrying out of the method of the invention is characterized by the fact that in each case one bridge branch is formed of two semiconductor switches (T1, T3; T2, T4) connected in series, that a current-measuring resistor (31, 32) is inserted between the semiconductor switches, and that the terminals of the current-measuring resistor (31, 32) are connected to corresponding inputs of a difference amplifier (OP A, OP B).

According to a further feature of the invention, one terminal each of an electromotive controlling element (M1, M2) is connected to the terminals of the current measuring resistors (31, 32).

Furthermore according to the invention, the outputs of the difference amplifiers (OP A, OP B) are connected to inputs of a microcomputer (3) which controls the semiconductor switches (T1 to T4) of the bridge output stage, and that a table is placed in a memory, the table containing the relationship between the deviations of the actual values from the desired values of the currents in the bridge circuit as a function of the corresponding state of switching of the bridge output stage and the corresponding errors.

Still further according to the invention, one of the terminals of the current-measuring resistors (31, 32) can be acted via voltage over at least one resistor (43), and preferably over a voltage divider (43, 44), and is connected with another input of the microcomputer (3).

BRIEF DESCRIPTION OF THE DRAWINGS

With the above and other objects and advantages in view, the present invention will become more clearly understood in connection with the detailed description of a preferred embodiment, when considered with the accompanying drawing, of which:

FIGS. 4a and 4b are tables showing the correspondence of the deviations of the currents, the state of switching of the bridge output stage, and the errors.

In these figures identical parts are provided with the same reference numbers.

DETAILED DESCRIPTION OF THE PREFERRED EMBODIMENT

Figure 1:
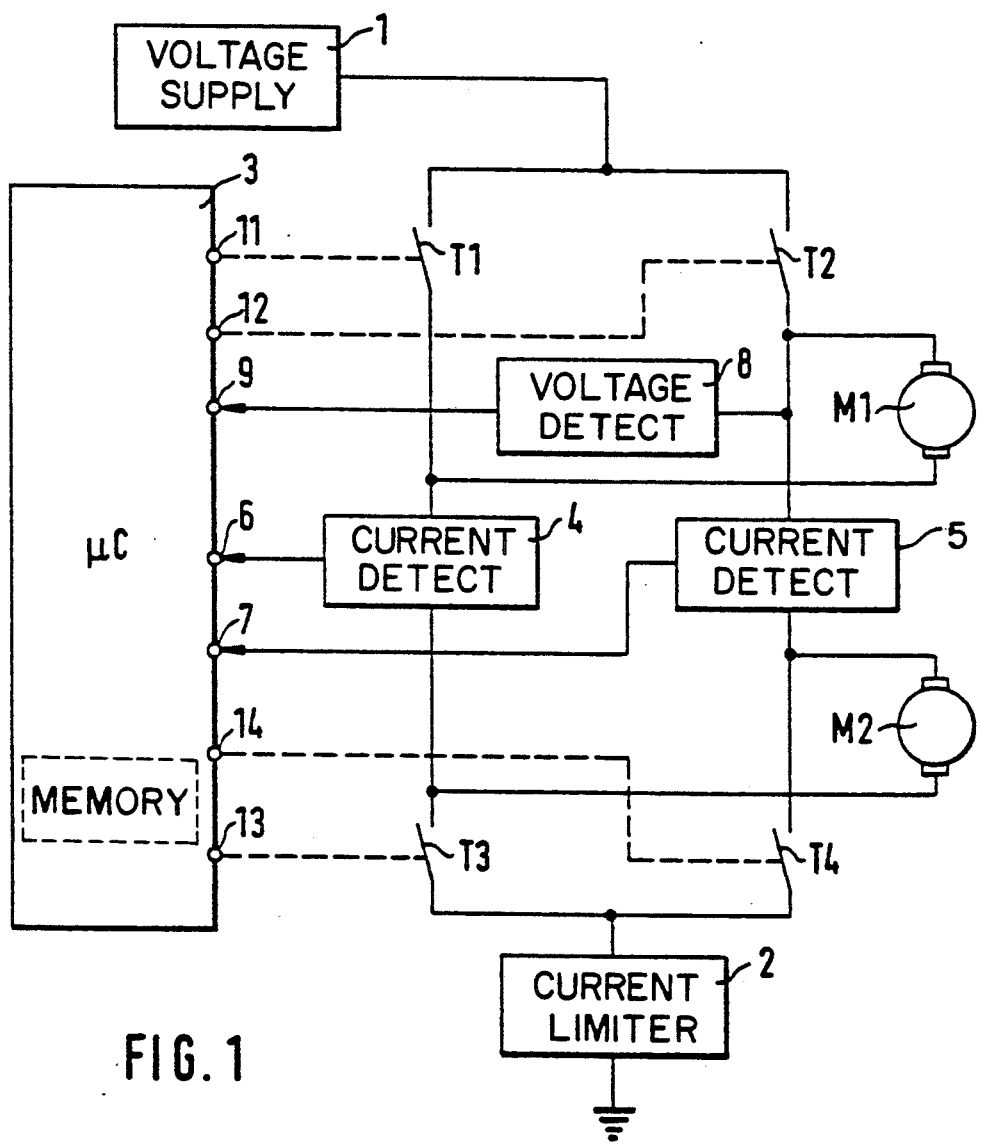
FIG. 1 is a block diagram of a circuit in accordance with the invention.

In the circuit shown in FIG. 1, for the operation of the motors M1 and M2 of two setting members not shown in detail there is provided a bridge output stage which is formed by the semiconductor switches T1, T2, T3, T4. The bridge output stage is connected to a current supply unit 1 and connected to ground potential via current-limiting circuit 2.

The semiconductor switches T1 to T4 are controlled by a control unit which is preferably formed of a microcomputer 3. In both branches of the bridge there is provided a current detection 4, 5 which feeds a voltage corresponding to the instantaneous current in each case to a respective input 6, 7 of the microcomputer. Furthermore, the voltage at one of the junctions of the bridge output stage is detected by means of a voltage-detection circuit 8 the output of which is connected to another input 9 of the microcomputer.

Upon the operation of the circuit of FIG. 1, the semiconductor switches T1 to T4 are switched into the conducting or nonconducting state depending on the desired direction of rotation or stoppage of the motors M1 and M2. Depending on the state of switching, different currents result in the branches of the bridge, which currents are monitored by the microcomputer and compared with desired values. As will be explained in detail below, it is possible with the aid of a table stored in a memory associated with the microcomputer to recognize individual errors, or to distinguish them from each other on basis of the behavior of the currents in the branches of the bridge.

Figure 2:
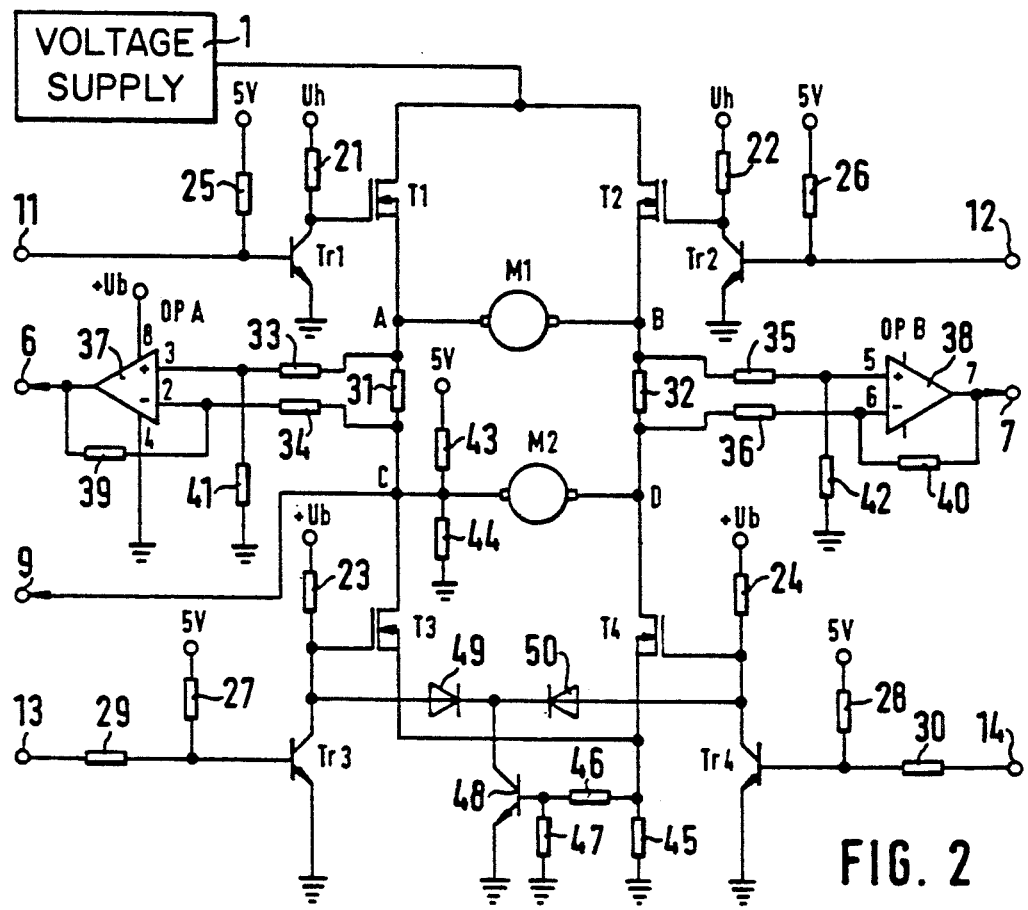
FIG. 2 is a circuit diagram of a part of the circuit of FIG. 1.

FIG. 2 shows one embodiment in a more detailed view, only the inputs and outputs of the computer being shown. With each of the semiconductor switches T1 to T4 there is associated a driving transistor Tr1 to Tr4. The operating resistors 21, 22 of the driving transistors Tr1, Tr2 are connected to a voltage Uh which is higher than the operating voltage Ub. The collectors of the driving transistors Tr3, Tr4 are connected by operating resistors 23, 24 to the source of operating voltage Ub. With each of the driving transistors there is associated, for the production of a base current, a resistor 25, 26, 27, 28 which is acted on by another operating voltage of 5 V.

Control signals are fed to the base terminals of the driving transistors Tr1 to Tr4 from the microcomputer, they being fed, in the case of the driving transistors Tr3 and Tr4, via in each case a resistor 29, 30. Within each of the bridge branches there is arranged a current measuring resistor 31, 32 the ends of which are connected in each case via a resistor 33, 34; 35, 36, to, in each case, one input of an operational amplifier OP A and OP B. The operational amplifiers are each degeneratively coupled with a corresponding resistor 39, 40. In each case, an additional resistor 41, 42 connects the non-inverting input to ground potential. On the outputs of the operational amplifiers OP A and OP B, and thus on the inputs 6, 7 of the microcomputer there is thus an amplified voltage drop over the resistors 31, 32 which is proportional to the current flowing through the corresponding resistor 31, 32.

In known per se manner, either the semiconductor switches T1 and T4 or the semiconductor switches T2 and T3 can be switched into conductive state for the operating of the motors M1 and M2 in different directions. For the disconnecting of the motors, either all semiconductors switches can become non-conductive or, for faster braking, the semiconductor switches T1 and T2 or the semiconductor switches T3 and T4 can be switched so as to be conductive.

The junctions between the semiconductor switches, the motors and the current-measuring resistors are referred to below as junctions A, B, C and D. In the embodiment shown, for the further monitoring, a voltage monitored by the microcomputer 3 is fed via a voltage divider 43, 44 to the junction C. The resistances 43, 44 of the voltage divider are so high that they do not affect the operation of the bridge output stage or of the motors M1, M2. In the operating state in which all semiconductor switches are non-conductive, the voltage resulting from the ratio of the resistors 43, 44 is formed at the input 9 of the microcomputer 3. However, if there is a connection to ground or to the operating voltage Ub in the region of the motors, then the voltage fed to the input 9 changes, which is evaluated in the microcomputer.

For the limiting of the current through the semiconductor switches T1 to T4 or through the motors M1, M2 a current-limiting circuit is provided. A voltage corresponding to the current through the bridge output stage is tapped off from another current-measuring resistor 45 and fed via a voltage divider 46, 47 to the base of a transistor 48. If the current through the bridge output stage exceeds a value which is still considered permissible, the transistor 43 becomes conductive and reduces the control voltage of the semiconductor switches T3, T4 via a respective diode 49, 50, as a result of which the current through the two branches of the bridge is limited. A protective circuit for short circuits to ground is produced in the current supply in similar fashion.

Figure 3:
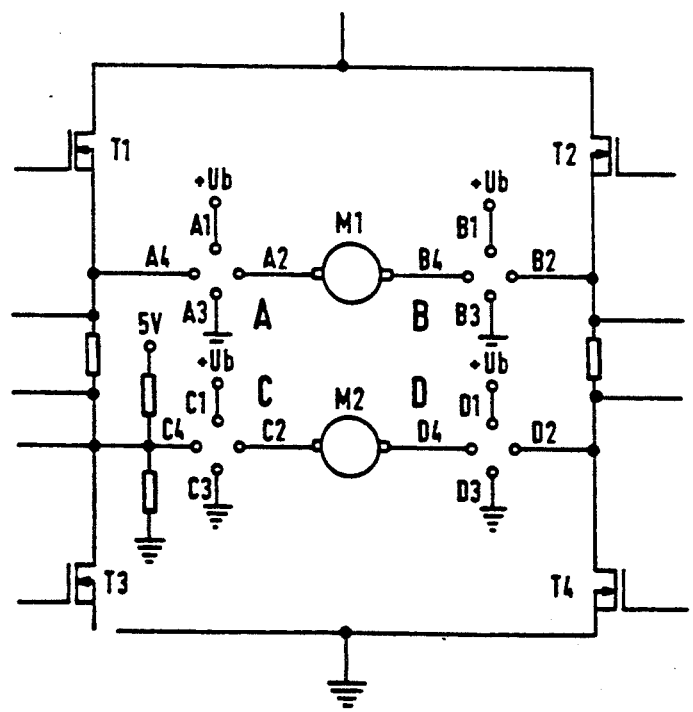
FIG. 3 is a bridge output stage of the circuit of FIG. 2 in connection with which the possibilities of errors are shown.

In order to explain the errors which may possibly occur in the feed lines to the motors M1 and M2, FIG. 3 shows a part of the circuit of FIG. 2, the junctions A to D being represented in each case in the form of four connection points A1 to A4 and B1 to B4 etc.

When the connection of the motors to the bridge output stage is intact, only the connection points 4 and 2 of each junction have a connection to each other. This connection is interrupted upon a tear in the line. Furthermore a ground can be present, in which case the connecting points 3 and 2 or 3 and 4 are connected to each other. The same applies in the event of contact with the operating voltage Ub, in which case there is a connection between 1 and 4 or 1 and 2. In addition to the single errors, the multiple errors can also occur in combined manner; thus, for instance, a cable can tear and one of the torn ends can come into contact with ground so that, for instance, the points 4 and 2 are not connected with each other but the points 4 and 3 are.

By a comparison of the currents flowing through the current-measuring resistors 31, 32 with their desired values in the corresponding state of switching of the bridge output stage it can be concluded which of the possible errors may be present. For this purpose, a table the content of which is shown in FIGS. 4a and 4b is placed in the microcomputer 3 (FIG. 1) or in a non-volatile memory associated with the microcomputer 3. In this connection, as a result of the desired/actual comparison of the currents for the switch conditions "T2-T3 conductive" and "T1-T4 conductive" it is indicated in each case whether the currents measured with the aid of the operational amplifiers OP A and OP B are less than (<) or greater than (>) the actual value or whether the current measured corresponds, for instance, to the actual value (=).

If, for instance, too small a current is found with the aid of the operational amplifier OP A and a correct current with the aid of the operational amplifier OP B when the semiconductor switches T2 and T3 are conductive, and during the switch condition "T1-T4 conductive" a correct current is measured with the aid of the operational amplifier OP A and too great a current with the aid of the operational amplifier OP B, this means a connection between the connection points A1 and A2. The feed line from the junction A to the motor M1 has therefore torn while the torn line of the motor M1 is contacting a line conducting the operating voltage Ub.

In addition to a large number of other possible errors there can be noted in the table of FIGS. 4a and b also error-free conditions of operation, namely when all four current measurements give a correct current and therefore four equal signs are contained in the table.

LEGENDS OF DRAWING FIGURES

FIG. 1

1: Voltage supply
2: Current limitation
4: Current detection
5: Current detection
8: Voltage detection

FIG. 2

1. Voltage supply

LEGENDS FOR FIGS. 4a and 4b

Ub=Operating Voltage; M=Motor; B=Bridge

The following numbers in parenthesis only represent legends in FIGS. 4a and 4b where the same numbers in parenthesis are shown. (These numbers are not intended to correspond to any other like numbers in the specification or other portions of the drawings.)

(1): Junction
(2): Connection
(3): Comment
(4): T2-T3 conductive
(5): T1-T4 conductive
(6): + means and
(7): None
(8): M torn M on Ub
(9): M torn M on ground
(10): M torn B on Ub
(11): M torn B on ground
(12): M and B on Ub
(13): M and B on ground
(14): M torn, one side
(15): M torn, both sides
(16): Everything OK
(17): M torn, B on Ub
(18): M torn, B on ground
(19): M torn, bridge on Ub
(20): M torn, M on ground
(21): M and B on Ub
(22): M and B on ground
(23): M torn, one side
(24): M torn, both sides
(25): Everything OK
(26): Current too low
(27): Correct current
(28): Current too high
(33): T2-T3 conductive
(34): T1-T4 conductive

I claim:

1. A method for monitoring electromotive controlling elements which are connected to a bridge output stage, the bridge having a first branch and a second branch for conducting electric current to the controlling elements, wherein a first and a second of the controlling elements are connected in parallel between said first branch and said second branch, the method comprising the steps of
    measuring a current in said first branch between terminals of said first and said second of the controlling elements,
    measuring a current in said second branch between terminals of said first and second of the controlling elements,
    comparing the actual values of currents in said first and said second branches with desired values which apply to a specific state of switching; and
    reading any error possibly present from a table as a function of a result of said comparing, and as a function of the state of switching of the bridge output stage.

2. A method for monitoring electromotive controlling elements which are connected to a bridge output stage, comprising the steps of
    comparing the actual values of currents in branches of a bridge with desired values which apply to a specific state of switching; and
    reading any error possibly present from a table as a function of a result of said comparing, and as a function of the state of switching of the bridge output stage;
    feeding a test voltage over a resistor of the bridge;
    observing if branches of the bridge are nonconducting in response to said feeding step;
    monitoring a voltage at one terminal of the bridge output stage; and
    adjusting the voltage at said one terminal.

3. A method according to claim 2, wherein the bridge includes a parallel connection of two electromotive controlling elements, the method including the steps of
    measuring the currents in the branches of the bridge between the terminals of the electromotive controlling elements on, in each case, one branch of the bridge.

4. A bridge circuit having a plurality of branches for conducting current to a plurality of electromotive elements, the circuit comprising
    one difference amplifier for each of said branches; and
    wherein each branch comprises two semiconductor switches connected in series, and a current-measuring resistor connected between the semiconductor switches, terminals of the current-measuring resistors of the respective branches being connected to inputs on corresponding ones of the difference amplifiers; and
    a first and a second of the electromotive elements are connected in parallel between a first branch and a second branch of said plurality of branches, the resistor in said first branch being connected between terminals of said first and said second electromotive elements, and the resistor in said second branch being connected between terminals of said first and said second electromotive elements.

5. A bridge circuit having a plurality of branches for conducting current to a plurality of electromotive elements, the circuit comprising
    one difference amplifier for each of said branches; and
    wherein each branch comprises two semiconductor switches connected in series, and a current-measuring resistor connected between the semiconductor switches, terminals of the current-measuring resistors of the respective branches being connected to inputs of corresponding ones of the difference amplifiers;
    one terminal in each of the electromotive elements is connected to the terminals of the current measuring resistor;
    a computer having a memory therein; and
    wherein the outputs of the difference amplifiers are connected to inputs of said computer for controlling said semiconductor switches; and
    a table of data is stored in the memory, the table containing a relationship between deviations of actual values from desired values of currents in the bridge circuit as a function of a corresponding state of switching of the bridge circuit and the corresponding outputs of said difference amplifiers.

6. A bridge circuit according to claim 5, further comprising resistive means comprising at least one resistor, the resistive means being connected in one of said branches to one terminal of the current-measuring resistor; and said one terminal of the current-measuring resistor is applied with voltage by said resistive means, said one terminal being connected with another input of the computer.

7. A bridge circuit according to claim 6, wherein said resistive means is a voltage divider.

8. A bridge circuit having a plurality of branches, the circuit comprising one difference amplifier for each of said branches, and wherein each branch comprises two semiconductor switches connected in series; and a current-measuring resistor connected between the semiconductor switches, terminals of the current-measuring resistors of the respective branches being connected to inputs of corresponding ones of the difference amplifiers;

a computer having a memory therein; and wherein the outputs of the difference amplifiers are connected to inputs of said computer for controlling said semiconductor switches; and a table of data is stored in the memory, the table containing a relationship between deviations of actual values from desired values of currents in the bridge circuit as a function of a corresponding state of switching of the bridge circuit and the corresponding outputs of said difference amplifiers.

* * * * *